(12) United States Patent
Stec

(10) Patent No.: US 10,757,333 B2
(45) Date of Patent: Aug. 25, 2020

(54) METHOD FOR DETERMINING BIAS IN AN INERTIAL MEASUREMENT UNIT OF AN IMAGE ACQUISITION DEVICE

(71) Applicant: FotoNation Limited, Galway (IE)

(72) Inventor: Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/154,450

(22) Filed: Oct. 8, 2018

(65) Prior Publication Data

US 2019/0052807 A1  Feb. 14, 2019

Related U.S. Application Data

(63) Continuation of application No. 15/468,409, filed on Mar. 24, 2017, now Pat. No. 10,097,757.

(51) Int. Cl.
*H04N 5/232* (2006.01)
*G01C 25/00* (2006.01)
*G06T 7/20* (2017.01)

(52) U.S. Cl.
CPC ....... *H04N 5/23254* (2013.01); *G01C 25/005* (2013.01); *G06T 7/20* (2013.01);
(Continued)

(58) Field of Classification Search
CPC .......... H04N 5/23254; H04N 5/23258; H04N 5/232; G06T 7/20; G06T 2207/30244;
(Continued)

(56) References Cited

U.S. PATENT DOCUMENTS 5,649,237 A   7/1997 Okazaki
5,912,676 A   6/1999 Malladi et al.
(Continued)

FOREIGN PATENT DOCUMENTS

EP  2306149   4/2011
GB  2481098   12/2011
(Continued)

OTHER PUBLICATIONS

European Search Report dated Aug. 28, 2018 (Search Completed on Aug. 21, 2018) in Application No. 18160155.0, Munich, Germany, pp. 1-7.
International Search Report and Written Opinion for International Application PCT/EP2013/061611, completed Sep. 4, 2013, dated Sep. 16, 2013, 11 Pgs.
International Search Report for International Application PCT/EP2014/055125, completed Jun. 30, 2014, dated Sep. 23, 2014, 6 Pgs.
(Continued)

*Primary Examiner* — Yogesh K Aggarwal
(74) *Attorney, Agent, or Firm* — Lee & Hayes, PC

(57) ABSTRACT

A method for determining bias in an inertial measurement unit of an image acquisition device comprises mapping at least one reference point within an image frame into a 3D spherical space based on a lens projection model for the image acquisition device to provide a respective anchor point in 3D space for each reference point. For reference points within a given image frame, an estimate of frame-to-frame motion at the reference point between the given frame and a previously acquired frame is obtained; a measure of device orientation for an acquisition time of the reference point in the given frame and the previously acquired frame, the measure including a bias component, is obtained from the inertial measurement unit; a corresponding anchor point is projected in 3D space according to a difference in the measure of device orientation in the given frame and the previously acquired frame to provide a 3D vector $V_m$; a result of the estimated frame-to-frame motion for the point from the given frame is projected into the previously acquired frame into 3D space to provide a 3D vector $V_e$; and a cross product $V_c$ of the 3D vectors $V_m$ and $V_e$ is used to update a bias component value.

20 Claims, 5 Drawing Sheets

(52) U.S. Cl.
CPC ............... *H04N 5/23258* (2013.01); *G06T 2207/10004* (2013.01); *G06T 2207/10028* (2013.01); *G06T 2207/30244* (2013.01); *H04N 5/232* (2013.01)

(58) Field of Classification Search
CPC . G06T 2207/10028; G06T 2207/10004; G06T 2207/10016; G06T 7/73; G06T 7/246; G01C 25/005
See application file for complete search history.

(56) References Cited

U.S. PATENT DOCUMENTS

| | | | |
|---|---|---|---|
| 6,130,912 | A | 10/2000 | Chang et al. |
| 8,493,454 | B1 | 7/2013 | Kohn et al. |
| 9,232,138 | B1 | 1/2016 | Baldwin |
| 2003/0114984 | A1* | 6/2003 | Scherzinger .......... G01C 15/00 701/472 |
| 2005/0100192 | A1 | 5/2005 | Fujimura et al. |
| 2007/0291047 | A1 | 12/2007 | Harville et al. |
| 2011/0218733 | A1* | 9/2011 | Hamza ................. G01C 21/165 701/469 |
| 2012/0078510 | A1* | 3/2012 | Ma ........................ G01C 21/165 701/426 |
| 2013/0194418 | A1 | 8/2013 | Gonzalez-Banos et al. |
| 2014/0049658 | A1 | 2/2014 | Yamazaki |
| 2015/0092048 | A1 | 4/2015 | Brunner et al. |
| 2017/0004358 | A1 | 1/2017 | Bose et al. |
| 2017/0004371 | A1 | 1/2017 | Getz et al. |
| 2017/0016728 | A1* | 1/2017 | Sheard ................. G01C 19/025 |

FOREIGN PATENT DOCUMENTS

| | | |
|---|---|---|
| WO | WO2008014472 | 1/2008 |
| WO | WO2010051147 | 5/2010 |
| WO | WO2014005783 | 1/2014 |
| WO | WO2014146983 | 9/2014 |
| WO | WO2017140438 | 8/2017 |

OTHER PUBLICATIONS

International Search Report and Written Opinion for International Application PCT/EP2017/050390, completed Jun. 8, dated Jun. 20, 2017, 20 Pgs.

Jayant Kumar, et al: "Fast Rule-Line Removal Using Integral Images and Support Vector Machines", 2011 nternational Conference on Document Analysis and Recognition, Sep. 1, 2011, pp. 584-588.

Karpenko, A. et al. "Digital Video Stabilization and Rolling Shutter Correction using Gyroscopes", Mar. 1, 2011, Stanford Tech Report CTSR Mar. 2011, retrieved from internet: URL: https:l/graphics.stanford.edu/papers/stabilization/Karpendo_gyro_pdf, pp. 1-7.

Kundra, L, et al: "Bias Compensation of Gyroscopes in Mobiles with Optical Flow", AASRI Procedia 9, 2014, 2014 AASRA Conference on Circuit and Signal Processing {CSP 2014), pp. 152-157.

Lai, M.ML et al: "Coding of image sequences using course quantization and feature based hierarchical block matching", Image Processing and its Application, 1992, International Conference on Maastricht, Netherlands, London, UK, IEE, US, Jan. 1, 1992, pp. 586-589.

Lepetit V, et al. "Monocular Model-Based 30 Tracking of Rigid Objects: A Survey", Foundations and Trends in Computer Graphics and VI, Now Publishers, Inc., US_ vol. 1, No. 1, Jan. 1, 2005, pp. 1-89.

Nam, K.M. et al: "A Fast Hierarchical Motion Vector Estimation Algorithm Using Mean Pyramid", IEEE Transactions on ~ircuits and Systems for Video Technology, IEEE Service Center, Piscataway, NJ, US, vol. 5, No. 4, Aug. 1, 1995, pp. 344-351.

Nguyen V. A. et al: "Fast Block-Based Motion Estimation Using Integral Frames", IEEE Signal Processing Letters, EEE Service Center, Piscataway, NJ, US, vol. 11, No. 9, Sep. 1, 2004, pp. 744-747.

Sauer, K. et al: "Efficient Block Motion Estimation Using Integral Projection", IEE Transactions on Circuits and Systems for Video Technology, IEEE Service Center, Piscataway, NJ, US, vol. 6, No. 5, Oct. 1, 1996, pp. 513-518.

\* cited by examiner

METHOD FOR DETERMINING BIAS IN AN INERTIAL MEASUREMENT UNIT OF AN IMAGE ACQUISITION DEVICE

This application claims priority to and is a continuation of U.S. patent application Ser. No. 15/468,409, filed on Mar. 24, 2017, now U.S. Pat. No. 10,097,757, the entire contents of which are incorporated herein by reference.

CROSS-REFERENCE TO RELATED APPLICATIONS

This application is a continuation of U.S. patent application Ser. No. 15/468,409 filed Mar. 24, 2017.

FIELD

The present invention relates to a method for determining bias in an inertial measurement unit of an image acquisition device.

BACKGROUND

It is known that inertial measurement units (IMU) comprising for example, a gyroscope can accurately measure short-term or relative changes in orientation of a device such as a camera, but suffer from a constant error (bias) that can additionally change over time (drift).

This drift can be determined and compensated for by using other sensors including magnetometers, accelerometers or other fiduciary points, but it may be not feasible or desirable to use or add such functionality and cost to a device. It will also be appreciated that even when available, magnetometers themselves need to be periodically re-calibrated and as such could not necessarily be relied upon all of the time to correct for other sensor drift.

In "Bias Compensation of Gyroscopes in Mobiles with Optical Flow", AASRI Procedia 9, 2014, pp 152-157, László Kundra and Péter Ekler consider the problem of using gyroscopes where the integration of raw angular rates with non-zero bias leads to a continuous drift of estimated orientation. A sensor fusion algorithm uses optical flow from the camera of the device. An orientation estimator and bias removal method are based on complementary filters, in combination with an adaptive reliability filter for the optical flow features. The feedback of the fused result is combined with the raw gyroscope angular rates to compensate for the bias.

The problem with this approach is that finding a global transformation between frames and converting it into camera orientation change is extremely CPU intensive. Using the motion vectors directly leads to large errors caused by erroneous motion estimates (outliers). Indeed one potential implementation suggests employing the RANSAC algorithm to reject such outliers when determining optical flow, but this would add significant computational overhead, so making the approach unfeasible or unattractive for implementation in portable image acquisition devices such as smartphones.

It is an object of the present invention to provide an improved method for determining IMU sensor bias.

SUMMARY

According to the present invention there is provided a method for determining bias in an inertial measurement unit of an image acquisition device according to claim 1.

The invention finds particular utility in a device IMU having only a gyroscope. But even when an accelerometer is available, it can only be used to determine bias compensation for all but 1 axis. It is not possible to compensate for the axis parallel to the gravity vector.

In a further aspect there is provided an image processing device arranged to perform the method of claim 1; and a computer program product comprising computer readable instructions, which when executed in an image processing device are arranged to perform the method of claim 1.

BRIEF DESCRIPTION OF THE DRAWINGS

An embodiment of the invention will now be described, by way of example, with reference to the accompanying drawings, in which.

DESCRIPTION OF THE EMBODIMENTS

Figure 1:
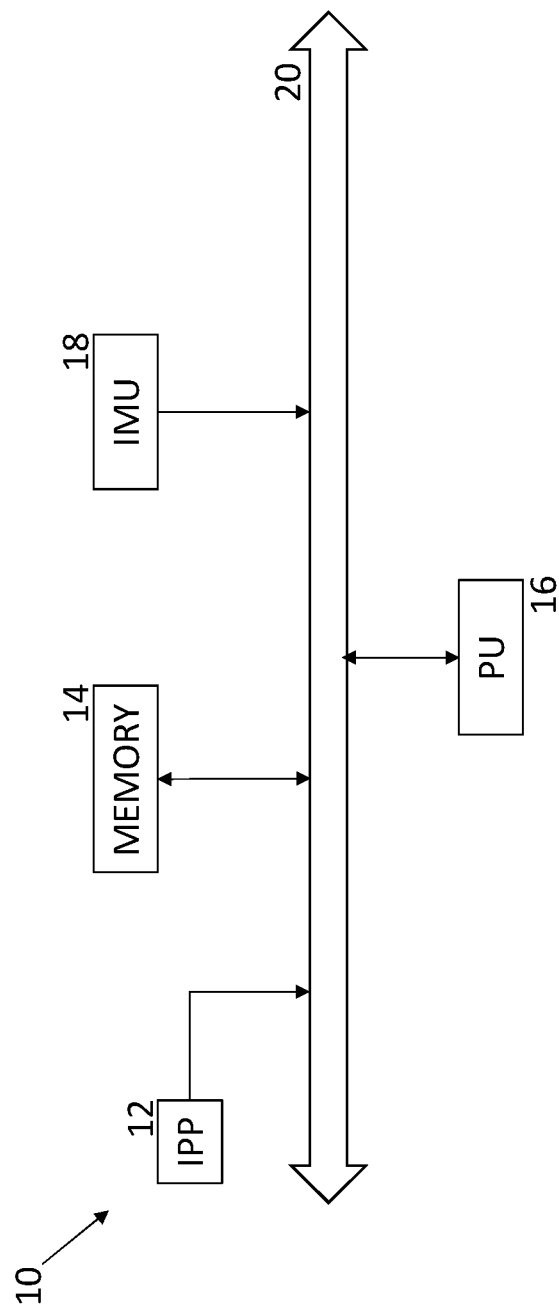
FIG. 1 shows schematically an image acquisition device on which embodiments of the present invention can be implemented.

Referring to FIG. 1, image acquisition devices 10 typically comprise an image processing pipeline (IPP) 12 which obtains acquired image data from an image sensor (not shown), conducts basic processing of the raw image data, such as color balancing, and writes acquired images or portions of images via a system bus 20 to system memory 14. Image frames can be acquired by the IPP 12 at frame rates from 24 fps up to from 60 fps to even 240 fps.

Such image acquisition devices 10 can include downstream dedicated image processing units which can analyse acquired images and process such images either to extract information from the images or to correct the images. Such processing can include face detection and tracking, object recognition or distortion correction such as disclosed in PCT Application WO2014/005783 (Ref: FN-384). Other processing can determine frame-to-frame motion, for example, as disclosed in WO2014/146983 (Ref: FN-389) and PCT Application No. PCT/EP2017/050390 (Ref: FN-495), the disclosures of which are incorporated herein by reference.

In the present specification, such processing units, which can be dedicated hardware modules or a generic central processing unit (CPU), are indicated as processing unit (PU) 16 which is capable of running either low-level firmware/software or in the case of the CPU, application software, capable of obtaining image information from memory 14 and further processing the images.

In the present specification, we refer to images being provided by IPP 12, however, it will be appreciated that these can comprise either individually acquired images or images within a video sequence.

It is known for image acquisition devices 10 to include inertial measurement units (IMU) 18 which can indicate a trajectory of device movement during image acquisition, enabling processing unit(s) 16 to use that information to correct an acquired image to take into account blur caused by involuntary or unwanted device motion during image capture or to stabilize video sequences. Indeed PCT Application No. PCT/EP2017/050390 (Ref: FN-495) discloses how such correction can take into account optical image stabilisation (OIS) which might be performed by a lens during image acquisition. Note that the description below is based on the assumption that OIS is switched off, but where known, this could be taken into account in variations of the described embodiment.

The IMU 18 sensors can comprise: gyroscopic sensors providing measures of rotational velocity around each of the three spatial axes (X,Y,Z); and accelerometers which provide measures of translational acceleration during image sequence capture and the direction of the gravitational force. The IMU can further include a magnetometer indicating the absolute angular orientation of the device relative to the earth's magnetic field.

As mentioned above, IMU sensors and gyroscopic sensors, in particular, tend to suffer from bias and drift.

Embodiments of the present invention use image-based motion estimation which, although suffering from noise and other disturbances, over a longer term, can provide an indicator proportional to the bias (B) in an IMU sensor.

Figure 2:
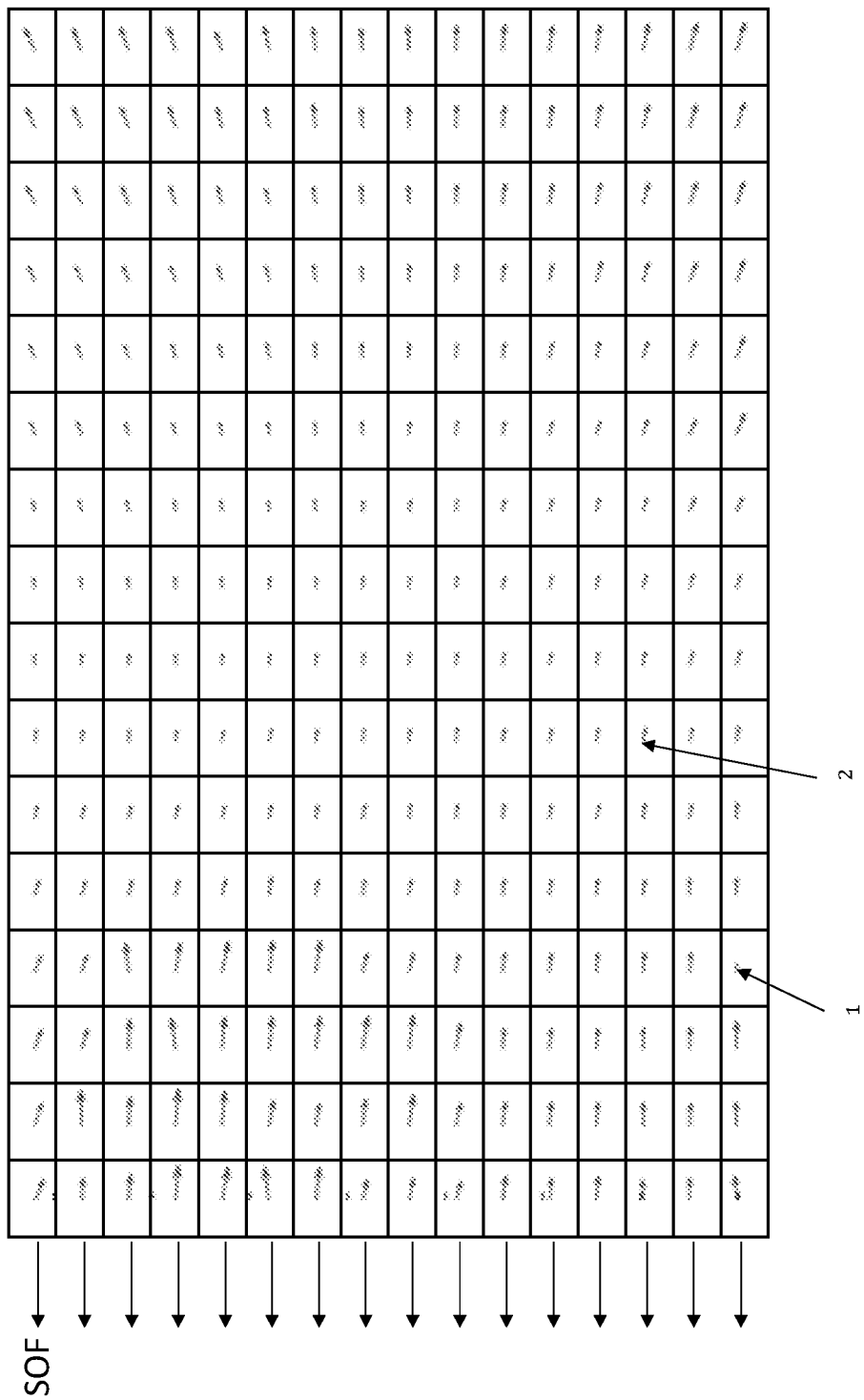
FIG. 2 shows an exemplary array of motion vectors indicating estimated frame-to-frame movement between two consecutive images.

Referring to FIG. 2, in one embodiment, an estimate of frame-to-frame image motion such as disclosed in PCT Application WO2014/146983 (Ref: FN-389-PCT) and PCT Application No. PCT/EP2017/050390 (Ref: FN-495-PCT), referred to above is employed.

This estimate comprises a 16×16 array E[ ] of 256 2D motion vectors (two of which $E_1$, $E_2$ are indicated—these motion vectors can be stored as circular (polar) or Cartesian coordinates) extending over the input image. Note that in this case, as is common, the image acquisition device employs a rolling shutter technique where one or more lines (rows) of pixels of an image are read from an image sensor during successive exposure intervals.

Also note that an array of motion vectors is provided for exemplary purposes only—any arrangement of motion vectors, even random, could be used.

As such, IMU measurements acquired during frame exposure need to be synchronised or correlated with the acquisition time for the portion of an image providing each row of the estimated motion vector array E[ ]. Thus, for example, the IMU measurements for the row of the movement array containing $E_2$ will precede those for $E_1$, assuming the start of field (SOF) is read from the top down. Nonetheless, it will be appreciated that the same interval df applies between a time of acquisition of one portion of an image and the corresponding portion of the image in a previously acquired frame.

Figure 3:
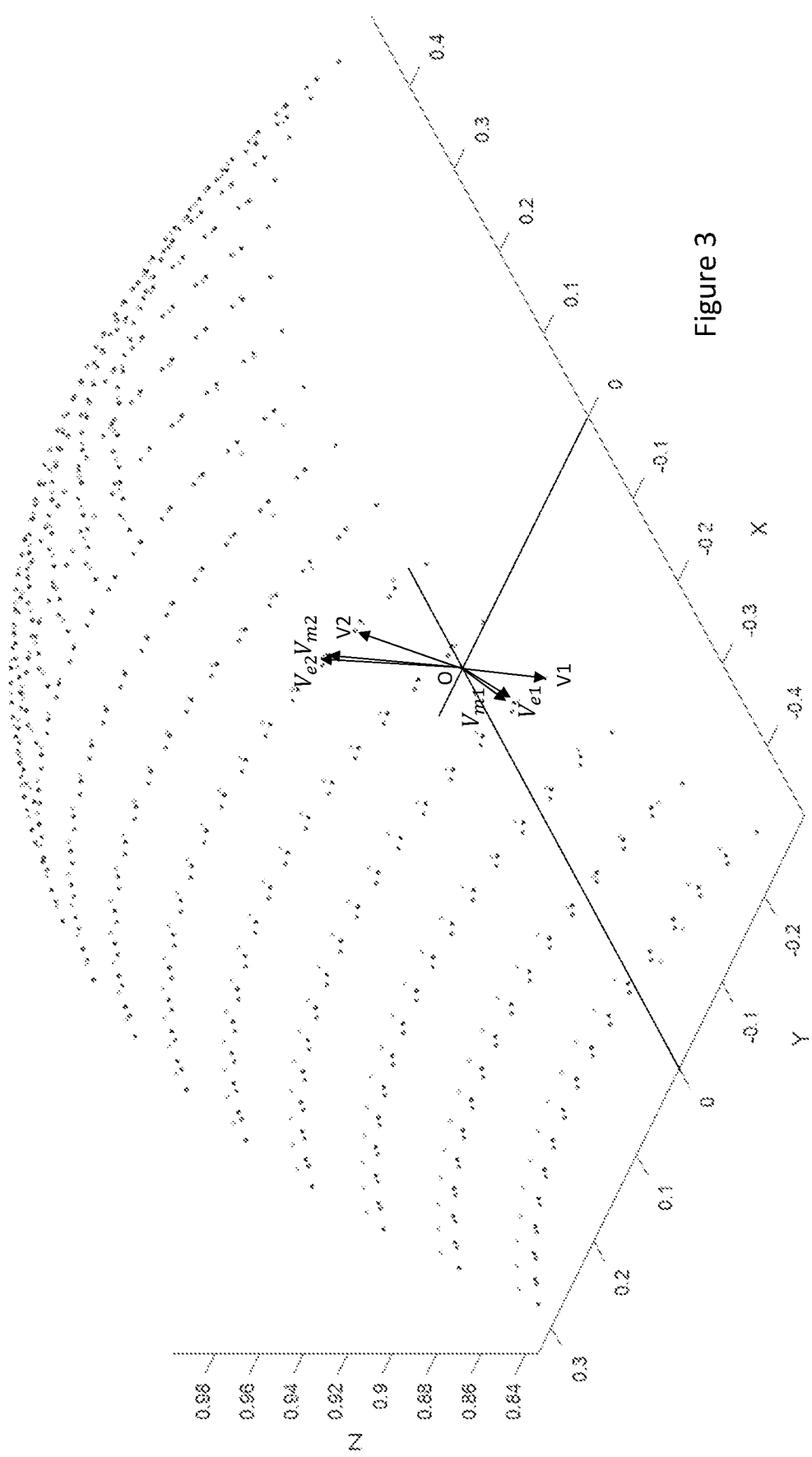
FIG. 3 shows the mapping of reference points from an image as well as measured IMU motion; and estimated motion into a 3D unit sphere.

Referring to FIG. 3, the present method begins by mapping 256 reference points, each corresponding to a cell of the 16×16 estimated motion vector array E[ ], onto a unit sphere in 3D space using a backward camera projection based on a lens projection model, such as described in PCT Application No. PCT/EP2017/050390 (Ref: FN-495-PCT). The reference points can be taken from the centre of each cell, but this is not essential.

This is a one-off operation and the mapped points act as anchors in 3D space and are used as a reference when processing all frames. In FIG. 3, two such anchor points V1 and V2 extending from the origin O are indicated.

In the next step, the 3D anchor points, such as V1 and V2, are transformed according to their respective locations in a previously acquired frame based on the camera orientation measured by the IMU 18. Thus, the embodiment attempts to determine a location in 3D space corresponding to the position of the reference point V1 according to a difference in its measured orientation at an acquisition time in a given image and its measured orientation at an acquisition time for the same point in the previously acquired image.

This is done by determining the time t of acquisition of each estimated motion vector in the array E[ ] (each row shares the same time) in a given frame and the previous frame.

Then the position of the camera measured by the IMU 18 is used to determine the camera orientations for each row of the array E[ ] in the present frame and the previously acquired frame. These measures can be represented in quaternion form as a quaternion function Q (t) representing the camera orientation at time t. Q(t) is obtained by numerical integration of the angular velocity ω sampled at interval dt. The value of ω can be measured by a gyroscope as a vector containing angular velocities around the gyroscope's local coordinate system axes:

$$\omega = [\omega_x, \omega_y, \omega_z]$$

Without taking into account bias, given the device orientation at the time of the previous gyroscope sample Q(t−dt), an update quaternion $\dot{Q}$ can be defined as:

$$\dot{Q} = 0.5 Q(t-dt) \cdot [0, \omega]$$

With dot representing the quaternion multiplication in this case. Thus, a new orientation of the device after an interval dt can be calculated as follows:

$$Q = Q(t-dt) + \dot{Q} dt$$

and this can be normalised as follows:

$$Q(t) = \frac{Q}{\|Q\|}$$

As explained, the gyroscope measurement contains a constant error called gyroscope bias B=$[B_x, B_y, B_z]$. If not removed, bias leads to error accumulation over time that significantly affects the measurement of the device's orientation. When bias is known, the update quaternion formula can have the following form:

$$\dot{Q} = 0.5 Q(t-dt) \cdot [0, \omega - B]$$

Knowing the camera orientation at the time t and the frame interval df, it is possible to calculate the location of the point in 3D space represented by V (for example V1, V2) in the previous frame which will be denoted by $V_m$:

$$V_m = V \cdot (Q(t)^{-1} \cdot Q(t-df)).$$

The power of −1 denotes the quaternion conjugation operation.

It will be seen from the description above that using quaternion functions to determine $V_m$ is computationally efficient, but nonetheless determining the coordinates for the vector $V_m$ according to the measured orientation for a reference point in a given frame and in a previously acquired frame can also be performed using other techniques such as a rotational matrix.

Now, consider one of the motion vectors from the array E[ ] estimated by the means of image analysis being denoted as $\vec{E} = \vec{AY}$, where A corresponds to the 2D reference point corresponding to a 3D space anchor point V. Thus, Y represents the location of A in 2D space in the previously acquired frame. Knowing the camera's sensor timing it is possible to determine the time t when the pixel underlying the point A was captured and to correlate this with a measured motion based location for the point $V_m$. The point Y, being the result of the 2D motion vector $\vec{E}$ on a 2D reference point location can also be projected into the 3D space, again using the same lens projection model transformation as for the reference points, to form the estimated vector $V_e$ in 3D space.

Thus, knowing the measured orientation $V_m$ in 3D space at the same time as the end points of each estimated motion vector, we can provide a corresponding estimated orientation $V_e$ in 3D space.

In an ideal case, where no measurement and estimation errors were present, the measured and estimated motions should have the same effect ($V_m=V_e$). However, in a real life situation, there will be some error $V_m \neq V_e$ as indicated by the differences between: $V_{m1}$ and $V_{e1}$; and $V_{m2}$ and $V_{e2}$ in FIG. 3; and by the difference between $V_m$ and $V_e$ in FIG. 4.

It will be appreciated that any estimated motion vector $\vec{E}$ within the array E[ ] and its counterpart in 3D space $V_e$ can contain errors, either due to noise or due to object motion within a scene being imaged. Nonetheless, a component of the difference comprises a systematic error caused by IMU sensor bias and the present method attempts to identify this error in as efficient as manner as possible.

As suggested in László Kundra and Péter Ekler, one approach to identifying the systematic error would be to use the least squares method to estimate a rotation matrix between measured and estimated vectors $V_m$, $V_e$. However, due to what may be a significant number of outliers in the motion matrix, a method such as RANSAC would be needed to reliably determine this rotation matrix and that would consume a significant amount of CPU power. Also, the rotation matrix would have to be converted to rotation angles to compensate for gyro bias and this would add several costly trigonometrical functions.

Figure 4:
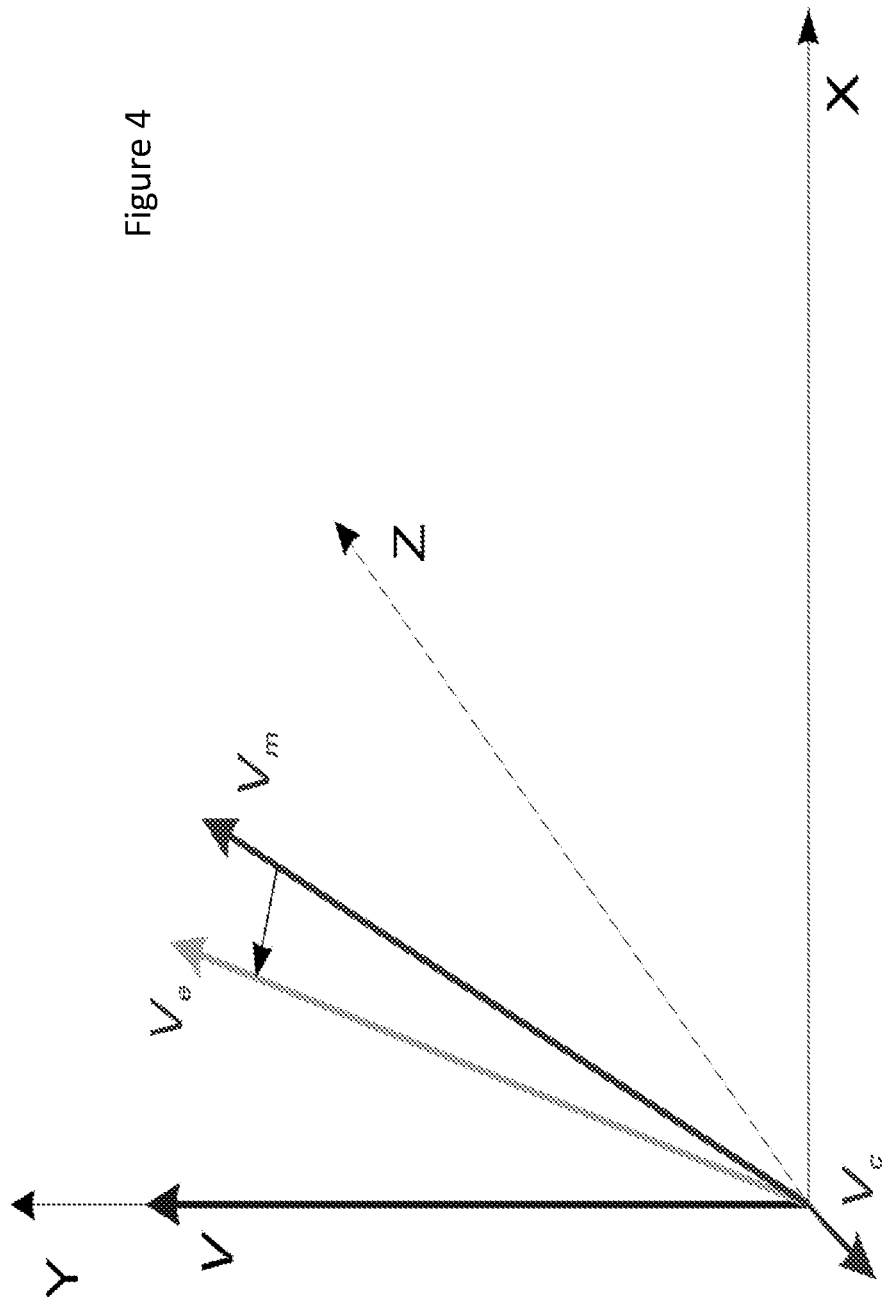
FIG. 4 illustrates the difference between the effect of an estimated motion $V_e$ and a measured motion $V_m$ on an anchor point V in 3D space for a region of an image, as well as the cross product $V_c$ of the vectors $V_m$ and $V_e$.

On the other hand, referring to FIG. 4, the present embodiment utilises a cross product of the 3D vectors determined above:

$$V_c = V_m \times V_e$$

as this is closely related to the angle between $V_m$ and $V_e$ and this value can be used to apply a correction to the bias estimation B used above.

A simple use of the measure $V_c$ would be to take an average/mean of the values for at least some of the cells of the array E[ ] over a frame or a number of frames. However, such a measure would be subject to a high level of noise as the estimated motion measurements in particular can contain significant outliers caused by parallax and moving objects. Those outliers would likely affect the mean values in a significant way introducing high estimation errors.

On the other hand, using a median value tends to more effectively eliminate outliers. However, this generally requires:
  a significant amount of memory to keep corrections for all vectors $V_c$, potentially for a number of past frames, to provide a reliable median measure; and
  sorting of a large amount of data, for example, even sorting 256 measurements for every frame would be a challenge for a portable device CPU or processing module.

In some embodiments, an estimate of median value M, which does not require memory or sorting is employed. A recursive formula for one such estimate M of the k-th sample is as follows:

$$M_k = M_{k-1} + \eta\ \text{sign}(s_k - M_{k-1}),$$

where $\eta$ is a very small value (e.g. 0.000001) and s is the current sample value.

In the present case, this approach can be used to update an estimate for the bias vector B directly from cross-product vector $V_c$ as follows:

$$B = B_{-1} + \eta\ \text{sign}(V_c),$$

where $B_{-1}$ denotes the bias estimate of the previous iteration.

This bias value B can then be used in the quaternion measurements above to provide a more accurate measurement of camera orientation at any given instant in real-time. Every time the quaternion update is calculated, the most recent estimate of B is used. This provides constant updates of correction even with the bias drifting over time.

It will be seen that using this embodiment, the bias component is updated as a function of information derived from a number of frames, yet without the processing burden of needing to store values and determine a median for a large number of values.

In refinements of the above disclosed embodiments, only selected vectors within any given estimated motion vector array E[ ] marked as valid after motion estimation are used in bias estimation. Indeed, validity or weight factors for the motion vectors $\vec{E}$ of the array E[ ] can be used to improve robustness of the bias estimate. Also, in the case of a scene with no details or extremely fast motion that results in rejection of all the vectors of the array E[ ], the last known bias estimate can still be used. This way erroneous or exceptional situations do not affect bias estimation or prevent calculation of camera orientation.

Figure 5:
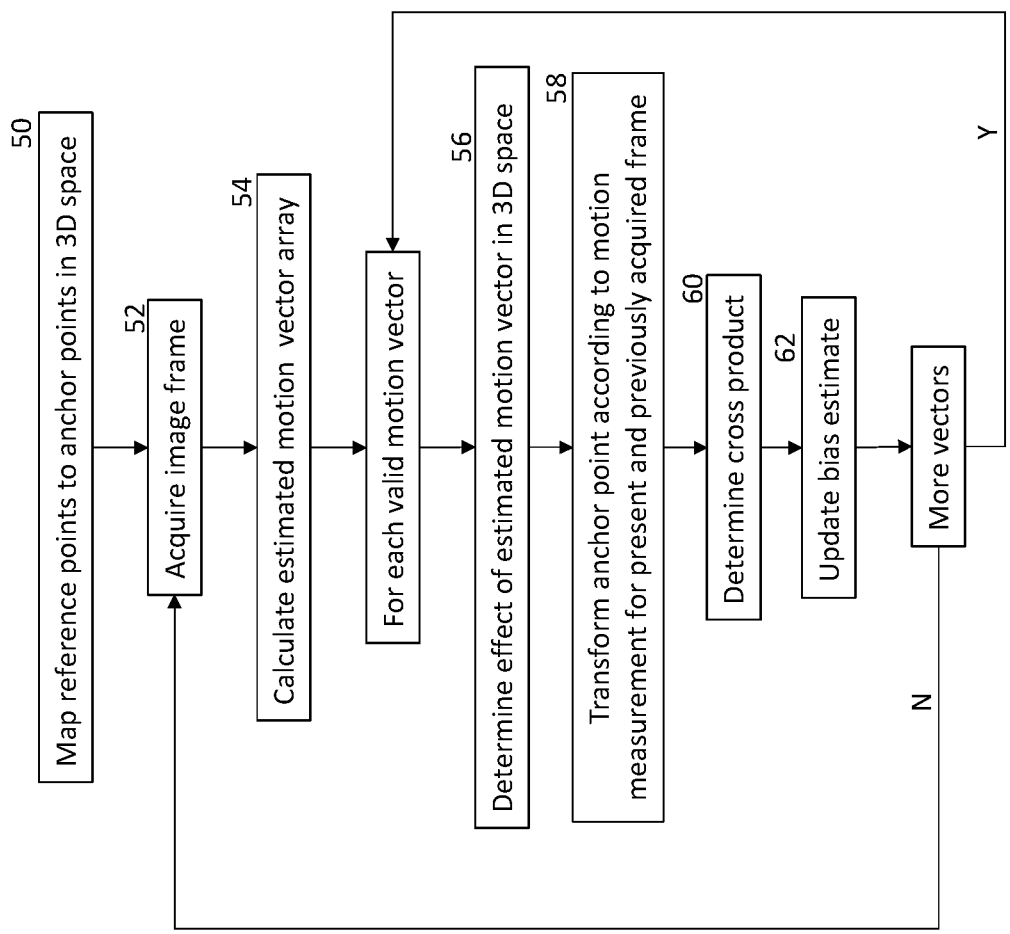
FIG. 5 is a flow diagram illustrating a method according to an embodiment of the invention.

Referring now to FIG. 5, the above described method can be summarised as follows. At step 50, reference points corresponding to cells within an estimated motion vector array E[ ] for an image are mapped to anchor points in a 3D spherical space using the lens projection model. At step 52 a new frame is acquired. At step 54, the estimated motion vector array E[ ] is calculated for the acquired frame relative to a previously acquired frame. At step 56, for each at least some of the cells of the estimated motion array E[ ], for example those indicating valid motion measures, the corresponding reference point, transformed according to the 2D motion vector for the cell is mapped into 3D spherical space using the lens projection model to provide vector $V_e$ in 3D space. At step 58, using orientation measurements provided by the inertial measurement unit, the anchor point corresponding to the cell is transformed according to the difference between the measured orientation for an acquisition time of the cell for the present frame and for the time of acquisition of the cell in the previously acquired frame to provide vector $V_m$ in 3D space. (It will be appreciated that steps 56 and 58 can be reversed.) At step 60, the cross product $V_c$ of vectors $V_e$ and $V_m$ is determined. At step 62, the sign of the cross product is used to update the bias estimate. The method now returns to step 52 to process the next motion vector, if any remain for the frame.

This method can be readily extended to work with other motion estimation methods than disclosed in WO2014/146983 (Ref: FN-389) and PCT Application No. PCT/EP2017/050390 (Ref: FN-495). For example, motion estimation can be based on tracked or matched feature points from within a scene being imaged without any significant changes to the method.

Thus the reference points within a frame for which measured orientations and orientations based on estimated motion are determined and compared do not need to be distributed regularly across a frame or even to extent across an entire frame.

The invention claimed is:

1. A method comprising:
   determining a motion between a first point depicted in a first image frame and a second point depicted in a second image frame;
   determining, using an inertial measurement unit, a first orientation of a device at a first time, the first time corresponding to the first image frame;
   determining, using the inertial measurement unit, a second orientation of the device at a second time, the second time corresponding to the second image frame;
   mapping a first vector in a three-dimensional space using at least the motion;
   mapping a second vector in the three-dimensional space using at least the first orientation and the second orientation; and
   determining, based at least in part on the first vector and the second vector, a value indicating a bias of an output of the inertial measurement unit.

2. The method as recited in claim 1, further comprising:
   determining a cross product of the first vector and the second vector,
   wherein determining the value indicating the bias of the output of the inertial measurement unit comprises determining, based at least in part on the cross product, the value indicating the bias of the output of the inertial measurement unit.

3. The method as recited in claim 1, wherein:
   mapping the first vector in the three-dimensional space using at least the motion comprises at least projecting the motion in the three-dimensional space; and
   mapping the second vector in the three-dimensional space using at least the first orientation and the second orientation comprises at least projecting a third point in the three-dimensional space according to a difference between the first orientation and the second orientation.

4. The method as recited in claim 1, further comprising updating an initial value for the bias of the output of the inertial measurement unit to the value indicating the bias of the output.

5. The method as recited in claim 1, further comprising:
   determining a difference between the first orientation and the second orientation,
   wherein mapping the second vector in the three-dimensional space using at least the first orientation and the second orientation comprises mapping the second vector using the difference.

6. The method as recited in claim 1, further comprising:
   determining an additional motion between a third point depicted in the first image frame and a fourth point depicted in the second image frame;
   mapping a third vector in the three-dimensional space using at least the additional motion; and
   determining, based at least in part on the second vector, the third vector, and the value, an additional value indicating the bias of the output of the inertial measurement unit.

7. The method as recited in claim 1, further comprising, prior to determining the motion, generating, by the device, image data representing a plurality of image frames, wherein the second image frame includes a subsequent image frame to the first image frame in the plurality of image frames.

8. The method as recited in claim 1, further comprising selecting the second image frame for determining the value based at least in part on the motion.

9. A device comprising computer-readable instructions that, when executed by the device, perform the method of claim 1.

10. A method comprising:
    determining a motion between a first point depicted in a first image frame and a second point depicted in a second image frame;
    determining, using an inertial measurement unit, a first orientation of a device at a first time, the first time corresponding to the first image frame;
    determining, using the inertial measurement unit, a second orientation of the device at a second time, the second time corresponding to the second image frame;
    determining a difference between the first orientation and the second orientation; and
    determining, based at least in part on the motion and the difference, a value indicating a bias of an output of the inertial measurement unit, wherein determining the value indicating the bias of the output of the inertial measurement unit comprises:
    generating a first vector based at least in part on the motion;
    generating a second vector based at least in part on the difference; and
    determining, based at least in part on the first vector and the second vector, the value indicating the bias of the output of the inertial measurement unit.

11. The method as recited in claim 10, wherein determining the value indicating the bias of the output of the inertial measurement unit further comprises:
    determining a cross product between the first vector and the second vector; and
    determining, based at least in part on the cross product, the value indicating the bias of the output of the inertial measurement unit.

12. The method as recited in claim 10, further comprising:
    generating the first vector by projecting a third point in a three-dimensional space according to the difference;
    generating the second vector by projecting the motion in the three-dimensional space; and
    generating a third vector representing a cross product of the first vector and the second vector in the three-dimensional space,
    wherein determining the value indicating the bias of the output of the inertial measurement unit comprises determining, based at least in part on the cross product, the value the bias of the output of the inertial measurement unit.

13. The method as recited in claim 10, further comprising updating an initial value for the bias of the output of the inertial measurement unit to the value indicating the bias of the output.

14. The method as recited in claim 10, further comprising, prior to determining the motion, generating, by the device, image data representing a plurality of image frames, wherein the second image frame includes a subsequent image frame to the first image frame in the plurality of image frames.

15. The method as recited in claim 10, further comprising selecting the second image frame for determining the value based at least in part on the motion.

16. A device comprising computer-readable instructions that, when executed by the device, perform the method of claim 10.

17. A device comprising:
an image capture device;
an inertial measurement unit;
at least one processor; and
memory storing instructions that, when executed by the at least one processor, cause the device to perform operations comprising:
determining a motion between a first point depicted associated with a first image frame and a second point associated with a second image frame;
determining, using the inertial measurement unit, a first orientation of the device at a first time, the first time corresponding to the first image frame;
determining, using the inertial measurement unit, a second orientation of the device at a second time, the second time corresponding to the second image frame;
mapping a first vector in a three-dimensional space using at least the motion;
mapping a second vector in the three-dimensional space using at least the first orientation and the second orientation; and
determining, based at least in part on the first vector and the second vector, a value indicating a bias of an output of the inertial measurement unit.

18. The device as recited in claim 17, the operations further comprising:
determining a cross product of the first vector and the second vector,
wherein determining the value indicating the bias of the output of the inertial measurement unit comprises determining, based at least in part on the cross product, the value indicating the bias of the output of the inertial measurement unit.

19. The device as recited in claim 17, the operations further comprising:
determining a difference between the first orientation and the second orientation,
wherein mapping the second vector in the three-dimensional space using at least the first orientation and the second orientation comprises mapping the second vector in the three-dimensional space using the difference.

20. The device as recited in claim 17, the operations further comprising:
determining an additional motion between a third point depicted in the first image frame and a fourth point depicted in the second image frame;
mapping a third vector in the three-dimensional space using at least the additional motion; and
determining, based at least in part on the second vector, the third vector, and the value, an additional value indicating the bias of the output of the inertial measurement unit.

* * * * *